Patented Jan. 27, 1931

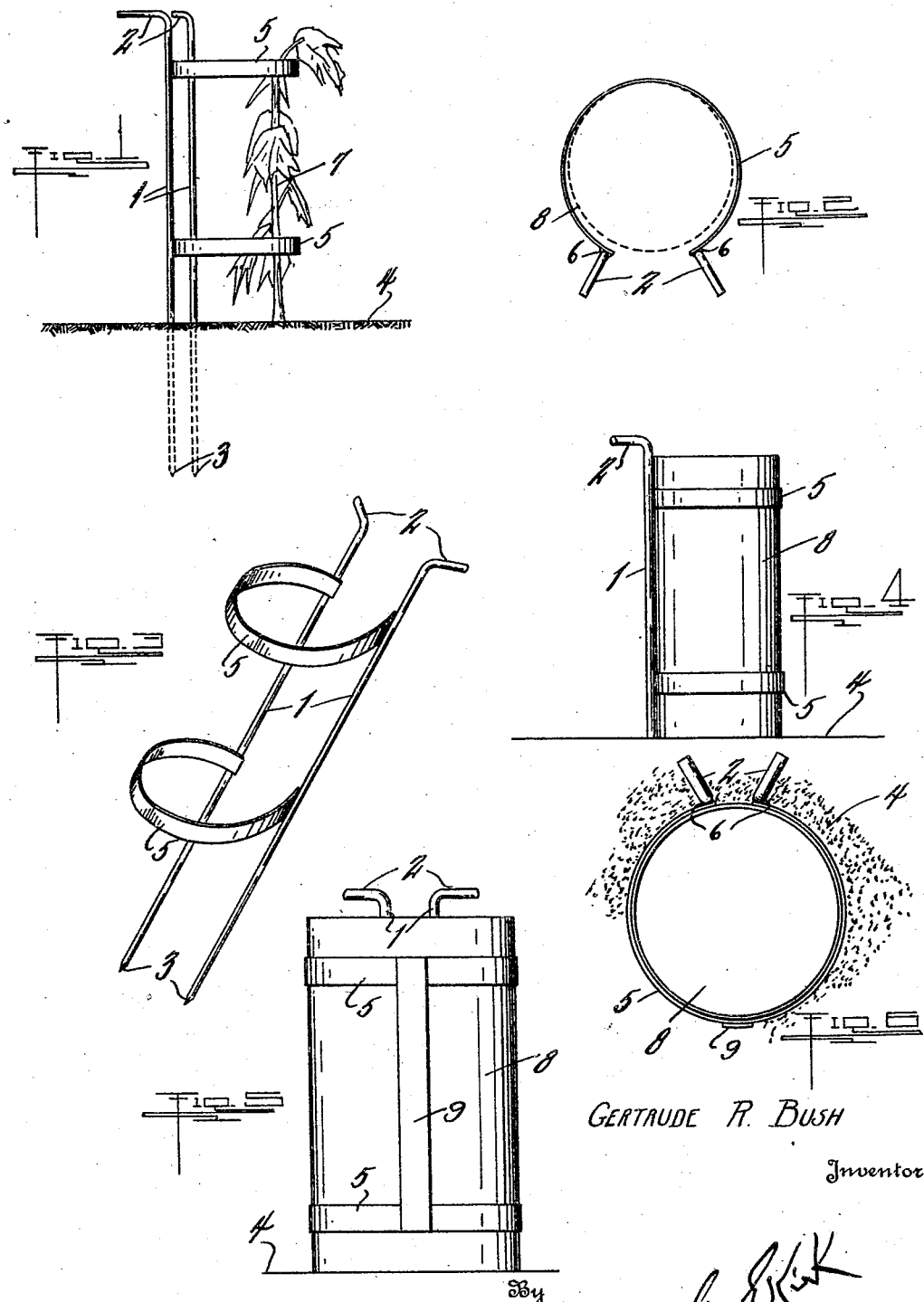

1,790,259

UNITED STATES PATENT OFFICE

GERTRUDE R. BUSH, OF SYLVANIA, OHIO

VEGETATION-PRESERVING DEVICE

Application filed August 11, 1927. Serial No. 212,208.

This invention relates to the care and preservation of vegetation.

This invention has utility in connection with the training and care of plants while growing as well as preservation of cut flowers.

Referring to the drawings:—

Fig. 1 is a side view of the device as used for holding plants against bending or breakage;

Fig. 2 is a plan view of the device of Fig. 1 in normal or open position;

Fig. 3 is a perspective view of the device of Fig. 1;

Fig. 4 is a side view of the device as used to maintain a container in upright position;

Fig. 5 is a front view of a device embodying the invention herein but adapted to engage containers of a large size; and Fig. 6 is a plan view of the device of Fig. 5.

Rods 1 have offset portions 2 for facilitating insertion of pointed or sharpened ends 3 of such rods into the ground 4. These rods 4 form a rigid standard. Disposed at intervals along the rods 1 and connecting them to hold such rods in approximately parallel relation are circular bands 5, preferably of light flexible spring metal. These bands 5 have their opposite ends each connected to one of the rods 1 by means of solder 6. The number of bands may vary according to the length of the rods and the use to which the devices are to be put. There may be but one band as when the device is to be used in maintaining small sprout 7 in upright position or the bands may be of sufficient number to hold a large bush.

In maintaining growing plants to prevent bending and breakage thereof from wind or rain, the devices are used alone, inserting the sharpened ends 3 into the earth 4 adjacent the plant 7 so that the band or bands may surround the plant and prevent such from dropping and hold such against damage.

The device has further utility in the preservation of cut flowers. It is especially adapted for use in cemeteries where cut flowers or plants are left outside where wind is likely to blow the containers over, spilling the water and scattering the flowers. In the instance wherein this device is used for cut flower preservation, container 8 of a desirable size may have the bands 5 surround it as shown in Fig. 2 and by pinching or drawing the rods together have such bands tightly embrace the container as shown in Fig. 6. Insertion into the ground of the sharpened ends 3 then holds the bands in vessel embracing position and with the vessel resting on the ground keeps such in an upright position against wind or due to top-heaviness of large bouquets.

Removal of the container from the ground draws the rods out of the earth and the spring metal bands flex away from the vessel and urge the rods 1 from the container side permitting ready removal of the device from the vessel. When in use a container may be chosen of sufficient capacity to hold water to preserve the life of the flowers a maximum time according to the bouquet size or moisture required.

The vessel embracing device herein may be of various sizes and one size will suffice for wide variations in containers. However, if a container is to be unusually large, the bands 4 may have intermediate connecting band 9 for additional rigidity of the device.

What is claimed and it is desired to secure by United States Letters Patent is:—

1. A vessel holder comprising a plurality of vessel embracing flat spring bands flexible against their resistance into vessel anchoring embracing position, and a pair of transversely extending rigid anchor rods fixed with the termini of the bands as in parallel relation and thrust into soil to hold the termini of the bands against shifting from the flexed embracing position.

2. A supporting member comprising a pair of parallel flat spring bands flexible against their resistance into a circular position, and a pair of transversely extending rigid anchor rods which are fixed with the termini of the bands to be thrust into soil to hold the termini of the bands against shifting from the flexed position.

In witness whereof I affix my signature.

GERTRUDE R. BUSH.